US008151255B2

(12) United States Patent
Gustafson et al.

(10) Patent No.: US 8,151,255 B2
(45) Date of Patent: *Apr. 3, 2012

(54) USING POLICE THREADS TO DETECT DEPENDENCE VIOLATIONS TO REDUCE SPECULATIVE PARALLELIZATION OVERHEAD

(75) Inventors: Phyllis E. Gustafson, Pleasanton, CA (US); Miguel Angel Lujan Moreno, Mountain View, CA (US); Michael H. Paleczny, San Jose, CA (US); Christopher A. Vick, San Jose, CA (US); Olaf Manczak, Hayward, CA (US); Jay R. Freeman, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1586 days.

This patent is subject to a terminal disclaimer.

(21) Appl. No.: 11/474,889

(22) Filed: Jun. 26, 2006

(65) Prior Publication Data

US 2008/0034371 A1   Feb. 7, 2008

(51) Int. Cl.
*G06F 9/44*   (2006.01)
*G06F 11/00*   (2006.01)
(52) U.S. Cl. ........ 717/160; 717/128; 717/131; 717/149; 717/151; 717/154; 714/47.1; 714/48; 714/54
(58) Field of Classification Search .................. None
See application file for complete search history.

(56) References Cited

PUBLICATIONS

Gupta et al, "Techniques for Speculative Run-Time Parallelization of Loops", in proceedings of super computing 1998, Nov. 1998.*

Rauchwerger, Lawrence; "Run-Time Parallelization: It's Time Has Come"; Department of Computer Science, Texas A&M University, College Station, Texas; vol. 24, No. 304; 1998 (26 pages).
Dang et al.; "The R-LRPD Test: Speculative Parallelization of Partially Parallel Loops"; Department of Computer Science, Texas A&M University, College Station, TX; IEEE; 2002; (11 pages).
Cintra, et al.; "Toward Efficient and Robust Software Speculative Parallelization on Multiprocessors"; PPoPP'03; Jun. 11-13, 2003; (13 pages).
Bruening, et al.; "Softspec: Software-based Speculative Parallelism"; Laboratory for Computer Science, MIT, 3rd ACM Workshop on Feedback-Directed and Dynamic Optimization (FDDO-3), Dec. 10, 2000; (10 pages).
Chen, et al.; "An Efficient Algorithm for the Run-time Parallelization of DOACROSS Loops"; Center for Supercomputing Research and Development, University of Illinois at Urbana-Champaign, IL; IEEE; 1994; (11 pages).
Banerjee et al; "Automatic Program Parallelization"; Proceedings of the IEEE, vol. 81, No. 2, pp. 211-243, 1993I (33 pages).
Cintra et al.; "Design Space Exploration of a Software Speculative Parallelization Scheme"; IEEE Transactions on Parallel and Distributed Systems; vol. 16, No. 5, May 2005; pp. 562-576; (15 pages).
Gupta et al.; "Techniques for Speculative Run-Time Parallelization of Loops"; Supercomputing, Nov. 1998; pp. 1-12 (12 pages).
Rauchwerger et al.; "The LRPD Test: Speculative Run-Time Parallelization of Loops with Privatization and Reduction Parallelization"; IEEE Transactions on Parallel and Distributed Systems; vol. 10, No. 2, Feb. 1999; pp. 1-20; (21 pages).

* cited by examiner

*Primary Examiner* — Lewis A Bullock, Jr.
*Assistant Examiner* — Mark Gooray
(74) *Attorney, Agent, or Firm* — Osha • Liang LLP

(57) ABSTRACT

A method for detecting a dependence violation in an application that involves executing a plurality of sections of the application in parallel, and logging memory transactions that occur while executing the plurality of sections to obtain a plurality of logs and a plurality of temporary results, where the plurality of logs is compared while executing the plurality of sections to determine whether the dependence violation exists.

16 Claims, 6 Drawing Sheets

//USING POLICE THREADS TO DETECT DEPENDENCE VIOLATIONS TO REDUCE SPECULATIVE PARALLELIZATION OVERHEAD

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A typical distributed computer system includes multiple interconnected nodes. Each node in the distributed computer system may include a separate processor. Accordingly, applications which execute in parallel on the distributed computer system are able to exploit the processing power provided by interconnection of the processors. For example, by combining the processing power provided by the multiple interconnected nodes, a given computation may be executed much faster by splitting the computation into multiple sections and executing each section of the application in parallel rather than executing the application serially on a single node.

Executing an application across several nodes typically involves determining which portions of the application should be performed serially and which portions of an application may be performed in parallel (i.e., the portion is safe to be performed in parallel). A portion of the application is deemed as parallelizable if the portion may be divided into discrete sections such that each section in the discrete sections may be executed by an individual thread simultaneously. In contrast, portions of the application that when parallelized would result in dependency violations (i.e., data dependencies between threads), such as multiple reads and writes to the same memory space by different threads, typically are not parallelized.

One method of parallelizing an application is for a programmer to analyze the application and determine how to parallelize the application. For example, the programmer may analyze a loop in the application to determine whether potential data dependencies between loop iterations within the loop of the application exist. Once the programmer has determined how to parallelize the loop, the programmer may add in specific instructions, such as message passing interface (MPI), to the application for parallelizing the loop in the application.

Another solution to parallelize the application is for a compiler to add in instructions for parallelizing the application statically at compile time. For the compiler to add the aforementioned instructions, the compiler must analyze the application for possible data dependencies, and determine how to break the application into discrete portions. Ensuring data dependencies are known is challenging if not impossible in general, because many commonly occurring loops have memory accesses that preclude automatic parallelism. Specifically, an application may have memory references which are only determined at execution time, such as subscripted subscripts (e.g., A[C[i]]=D[i]) and pointer variables (e.g., *ptr=0.50; ptr++).

Another possible solution is to perform the analysis after the execution time using the assumption that the loop is parallelizable. If a dependence violation is discovered after execution, then the loop may be deemed as not parallelizable.

SUMMARY

In general, in one aspect, the invention relates to a method for detecting a dependence violation in an application. The method comprises executing a plurality of sections of the application in parallel, and logging memory transactions that occur while executing the plurality of sections to obtain a plurality of logs and a plurality of temporary results, wherein the plurality of logs is compared while executing the plurality of sections to determine whether the dependence violation exists.

In general, in one aspect, the invention relates to a system for detecting a dependence violation in an application. The system comprises a plurality of co-threads configured to execute a plurality of sections of the application in parallel to create a plurality of temporary results, and log memory transactions that occur while executing the plurality of sections to obtain a plurality of logs, wherein the plurality of logs is compared by at least one police thread while the plurality of sections are executing to determine whether the dependence violation exists.

In general, in one aspect, the invention relates to a distributed computer system having a plurality of nodes for performing a method. The method comprises executing a plurality of sections of the application in parallel by a plurality of co-threads, logging memory transactions that occur while executing the plurality of sections to obtain a plurality of logs, comparing the plurality of logs, wherein comparing the plurality of logs is performed while executing the plurality of sections to determine whether a dependence violation exists, wherein the plurality of co-threads execute on the plurality of nodes.

Other aspects of the invention will be apparent from the following description and the appended claims.

DETAILED DESCRIPTION

Figure 1:
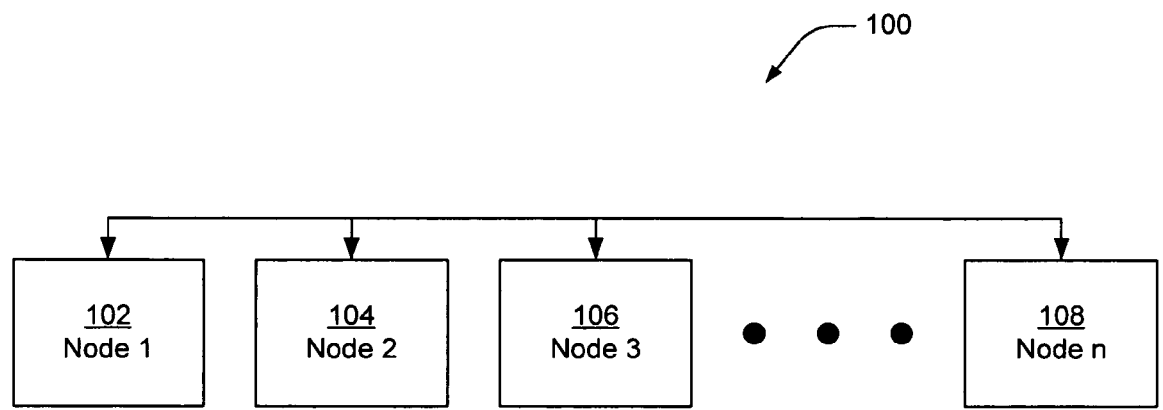
FIG. 1 shows a schematic diagram of a distributed computer system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for parallelizing an application at execution time. Specifically, embodiments of the invention provide a method for identifying when a dependency violation exists at runtime. Thus, because dependency violations may be found earlier in execution rather than at the end of execution, the cost of the dependency violation (i.e., wasted execution time) is minimized.

FIG. 1 shows a schematic diagram of a distributed computer system in accordance with one embodiment of the invention. The distributed computer system (100) corresponds to virtually any type of interconnection of nodes (e.g., node 1 (102), node 2 (104), node 3 (106), node n (108)) in virtually any topology. For example, the nodes (e.g., node 1 (102), node 2 (104), node 3 (106), node n (108)) may be arranged in a star topology, a ring topology, or a tree topology. Alternatively, the distributed computer system (100) may correspond to one with multiple processors with shared memory system (i.e., each node is a processor), several interconnected servers, or a group of computers connected over the Internet. Further, the distributed computer system (100) may also include one or more subsystems (not shown), in which the subsystem is of a different type and topology than the parent system (i.e., the distributed system itself may be composed to an aggregation of other distributed systems).

In addition, the distributed computer system (100) may correspond to a multi-threaded processor. Specifically, the nodes (e.g., node 1 (102), node 2 (104), node 3 (106), node n (108)) of the distributed computer system (100) may correspond to threads that are available in the multithreaded processor.

Figure 2:
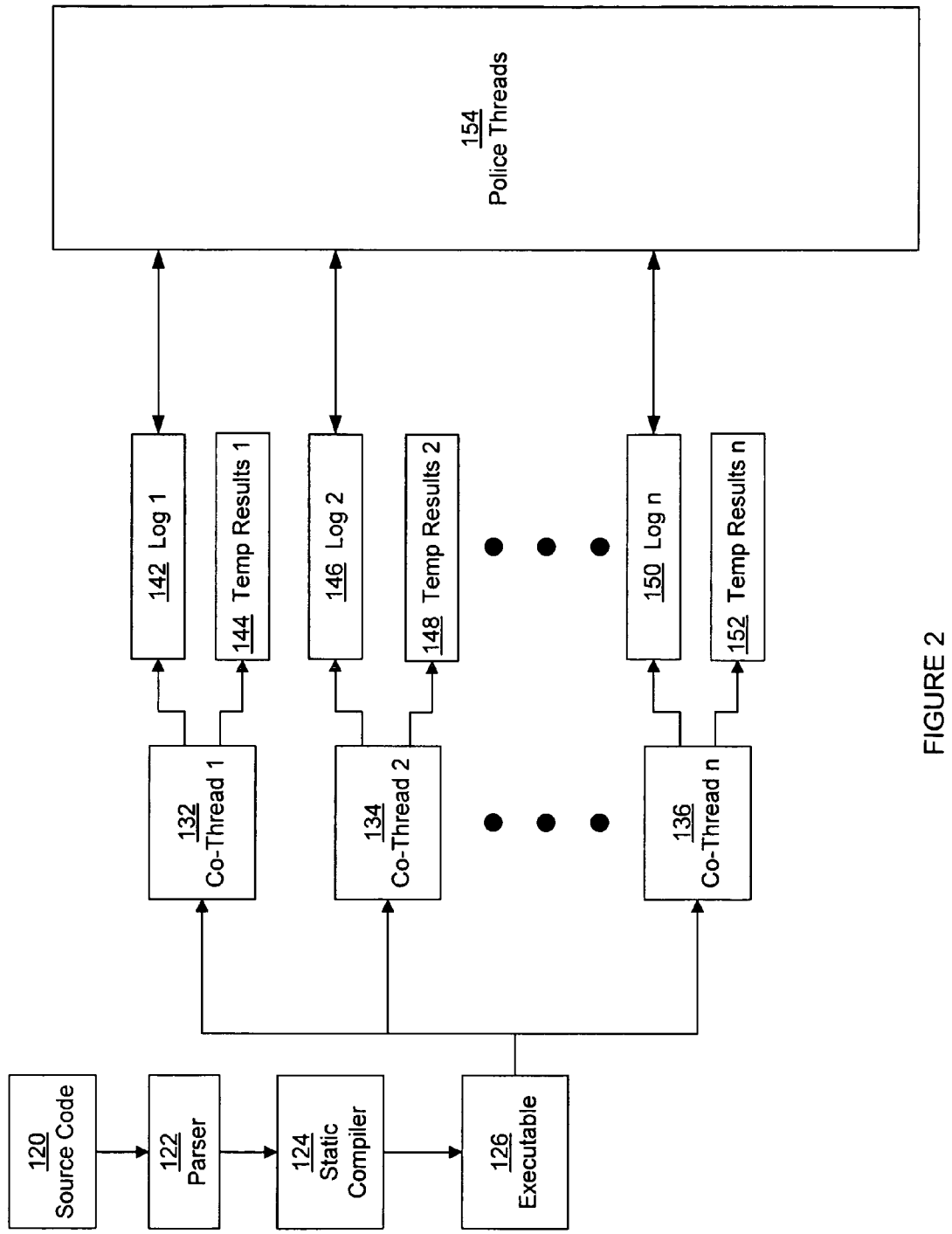
FIG. 2 shows a schematic diagram of a system for detecting dependence violations in a distributed computer system in accordance with one embodiment of the invention.

FIG. 2 shows a schematic diagram of a system for detecting dependence violations in a distributed computer system in accordance with one embodiment of the invention. The system includes source code (120), a parser (122), a static compiler (124), an executable (126), co-threads (e.g., co-thread 1 (132), co-thread 2 (134), co-thread n (136)), and at least one police thread (154). Each of these aforementioned components is described below.

The source code (120) in one embodiment of the invention, corresponds to an application or part of an application written in any programming language, such as JAVA™, C, C++, Fortran, High Performance C, High Performance Fortran, etc. The source code (120) may also include instructions for statically parallelizing the source code (120), such as instructions for Message Passing Interface (MPI), etc.

Additionally, in one embodiment of the invention, the source code may include optional portions (e.g., conditional expressions, function calls, etc.) one or more loops (e.g., recursive expressions, a "for" loop, a "while" loop, a "do while" loop, etc.), or any other such instructions that may allow the application to be divided into sections. A section may correspond to a branch in a conditional expression, iterations of a loop, etc. In one or more embodiments of the invention, sections of an application span a loop, iterations of a loop, an application, a portion of the application, or a conditional expression of the application when each section of the multiple sections correspond to a subset of the instructions in the loop, the iterations of the loop, the application, the portion of the application, or the conditional expression such that none of the subsets of instructions overlap. For example, if the loop corresponds to a "for" loop that has ten iterations, and if the first five iterations may correspond to one section and the next five iterations correspond to a second section, then the two sections span the loop. As another example, with regards to conditional expressions, two sections span a conditional true/false expression when one section corresponds to the path of instructions if the conditional evaluates to true while another section corresponds to the path of instructions if the conditional evaluates to false.

Continuing with FIG. 2, in one embodiment of the invention, associated with the source code (120) is a parser (122). The parser (122) corresponds to a program that includes functionality to analyze the source code (120) and modify the source code (120) into parsed source code. In one embodiment of the invention, parsed source code may be organized and represented in a parse tree.

Associated with the parser (122), in one embodiment of the invention, is a static compiler (124). The static compiler (124), in one embodiment of the invention, corresponds to a program that includes functionality to transform parsed source code into object code or an executable (126). In one embodiment of the invention, the static compiler (124) may also include functionality to perform a static analysis on the parsed source code to determine which portions of the parsed source code may be performed in parallel. Further, the static compiler (124) may include functionality to determine and flag the portions of parsed source code that may not be parallelized at compile time because of the possibility of dependency violations because of indeterminable variables. Additionally, the static compiler (124), in one embodiment of the invention, may include functionality to insert the instrumentation for parallelization.

An indeterminable variable corresponds to a variable for which memory accesses cannot be determined at compile time, such as subscripted subscripts and pointer variables. Examples of indeterminable variables include A[C[i]]=B[i] and D[i]=X in which X is a pointer variable. In accordance with one embodiment of the invention, in the aforementioned example, A[C[i]] and D[i] are indeterminable variables and, thus, cannot be parallelized at compile time.

Continuing with the discussion of FIG. 2, the executable (126) corresponds to code which may be executed by threads (e.g., co-thread 1 (132), co-thread 2 (134), co-thread n (136)) in the distributed computer system. In one embodiment of the invention, the executable (126) may correspond to byte code to be executed on a virtual machine.

Further, associated with the executable (126) may be a runtime parser (not shown) in accordance with one embodiment of the invention. The runtime parser includes functionality to parse the executable and create instrumented code which has the necessary instrumentation added for executing the code in parallel. Specifically, the instrumented code specifies how to divide the code into sections for individual co-threads (e.g., co-thread 1 (132), co-thread 2 (134), co-thread n (136)) to execute in parallel. For example, the instrumented code may specify which co-thread is responsible for executing a specific section. Further, in one embodiment of the invention, the instrumented code may also include functionality to enable co-threads executing the executable (126) to log memory accesses associated with the indeterminable variables.

In one embodiment of the invention, a thread (e.g., co-thread 1 (132), co-thread 2 (134), co-thread n (136), police threads (154)) corresponds to a set of instructions in execution. Each co-thread (e.g., co-thread 1 (132), co-thread 2 (134), co-thread n (136), police threads (154)) may execute in parallel with other threads (e.g., co-thread 1 (132), co-thread 2 (134), co-thread n (136), police threads (154)).

A co-thread (e.g., co-thread 1 (132), co-thread 2 (134), co-thread n (136)), in one embodiment of the invention, corresponds to a process executing in the system. Specifically, each co-thread (e.g., co-thread 1 (132), co-thread 2 (134), co-thread n (136)) may be configured to execute a section of the application. Associated with each co-thread (e.g., co-thread 1 (132), co-thread 2 (134), co-thread n (136)) is a log (e.g., log 1 (142), log 2 (146), log n (150)) and temporary results (e.g., temp results 1 (144), temp results 2 (148), temp results n (152)).

The log (e.g., log 1 (142), log 2 (146), log n (150)), in one embodiment of the invention, corresponds to a data store for storing memory accesses performed during execution of the section of the loop. With the memory accesses, the log (e.g., log 1 (142), log 2 (146), log n (150)) may also have a loop iteration variable and/or an instruction counter specifying when the memory access occurred. In one embodiment of the invention, the log (e.g., log 1 (142), log 2 (146), log n (150)) only stores the memory accesses related to the indeterminable variables. Those skilled in the art will appreciate that in one embodiment of the invention, the co-threads (e.g., co-thread 1 (132), co-thread 2 (134), co-thread n (136)) may share logs (e.g., log 1 (142), log 2 (146), log n (150)). Accordingly, each log (e.g., log 1 (142), log 2 (146), log n (150)) may be associated with one or more co-threads (e.g., co-thread 1 (132), co-thread 2 (134), co-thread n (136)).

Also associated with each co-thread (e.g., co-thread 1 (132), co-thread 2 (134), co-thread n (136)) are temporary results (e.g., temp results 1 (144), temp results 2 (148), temp results n (152)). In one embodiment of the invention, the temporary results (e.g., temp results 1 (144), temp results 2 (148), temp results n (152)) correspond to the results generated during the execution of the section of the application by the particular co-thread (e.g., co-thread 1 (132), co-thread 2 (134), co-thread n (136)). Specifically, the temporary results (e.g., temp results 1 (144), temp results 2 (148), temp results n (152)) corresponds to results that have been generated but are not yet committed. Committing results as used herein is consistent as understood and practiced by one skilled in the art.

Continuing with FIG. 2, a police thread (154) corresponds to a thread that includes functionality to review the logs (e.g., log 1 (142), log 2 (146), log n (150)) and determine whether a dependency violation exists. In one or more embodiments of the invention, the police threads (154) execute in parallel with the co-threads (e.g., co-thread 1 (132), co-thread 2 (134), co-thread n (136)).

The police threads (154) may be assigned in virtually any manner. For example, the set of logs may be divided into subsets, such that a police thread assigned to a subset is responsible for checking either the reads or the writes in the subset do not have a dependency violation with reads or writes inside and outside of the subset. In the following description, a write corresponds to any modification, such as deleting a value, writing a new value, etc. For example, a first police thread may be responsible for the subset containing log 1 (142), while a second police thread may be responsible for the subset containing log 2 (146) and log n (150). In the example, the first police thread may compare the writes in log 1 (142) with the reads in both log 2 (146) and log n (150).

Alternatively, the police thread may be divided based on combinations of logs. For example, one police thread may be responsible for comparing log 1 (142) with log 2 (146) and log 2 (146) with log n (150) while another police thread is assigned to compare log 1 (142) with log n (150).

Figure 3:
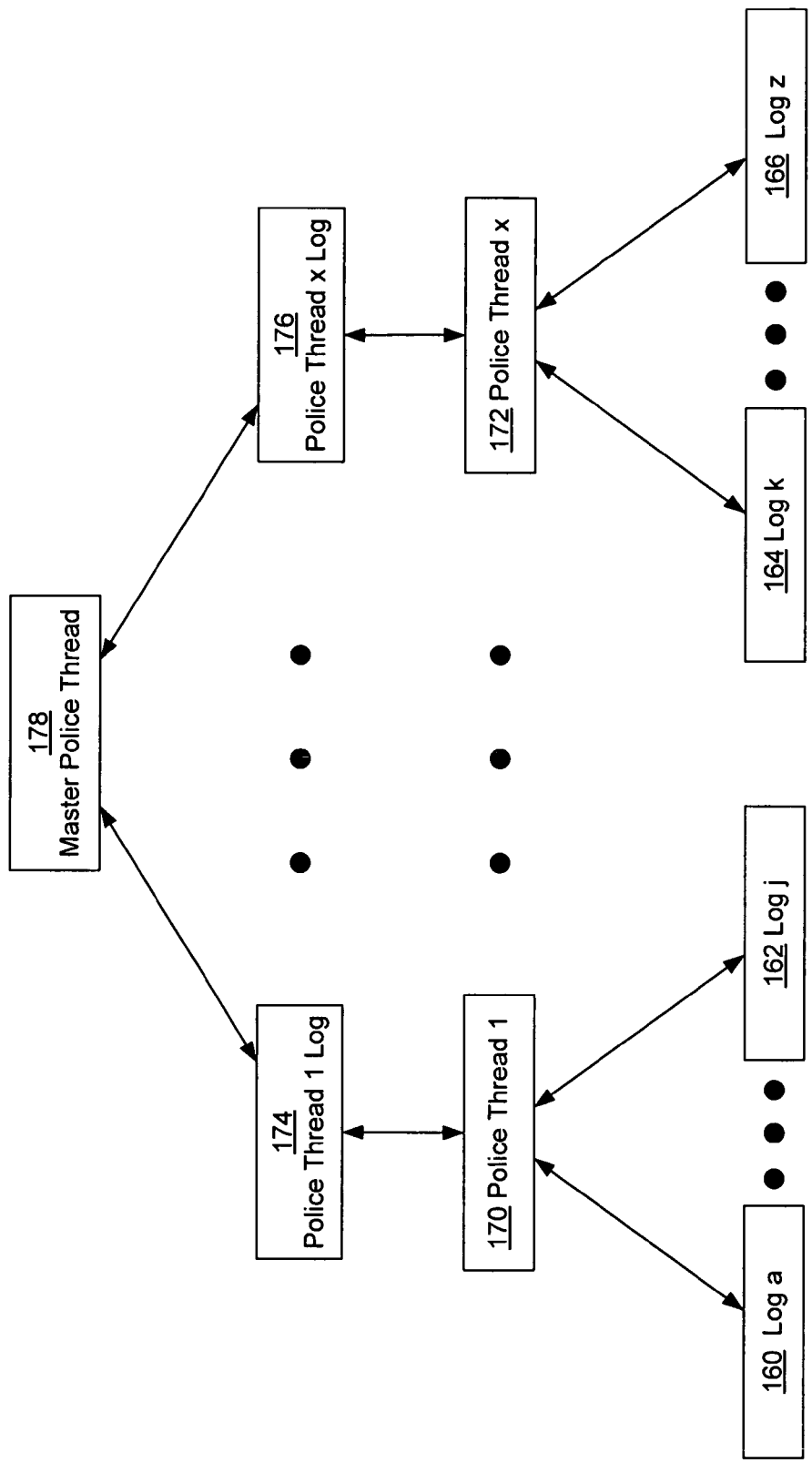
FIG. 3 shows a schematic diagram of a hierarchy for detecting dependence violations in a distributed computer system in accordance with one embodiment of the invention.

In another alternative, the police threads may be assigned in a hierarchical manner. FIG. 3 shows a schematic diagram of a hierarchy for detecting dependence violations in a distributed computer system in accordance with one embodiment of the invention. In the hierarchy, police threads (e.g., police thread 1 (170), police thread x (172)) are assigned to a subset of the logs (e.g., log a (160), log j (162), log k (164), log z (166)). The subset of logs may correspond to the logs for a collection of co-threads that execute on a single computer node. Specifically, a single police thread may be responsible for comparing the logs that are produced on the node.

In accordance with one or more embodiments of the invention, each police thread (e.g., police thread 1 (170), police thread x (172)) is responsible for reviewing the logs that are the children of the police thread (e.g., police thread 1 (170), police thread x (172)) in the hierarchy and write to a police thread log (e.g., police thread 1 log (174), police thread x log (176)). The police thread logs (e.g., police thread 1 log (174), police thread x log (176)) correspond to logs about the memory references in the co-thread logs. A master police thread (178) includes functionality to compare police thread logs (e.g., police thread 1 log (174), police thread x log (176). Because the police thread (e.g., police thread 1 (170), police thread x (172)) has already checked for dependency violations when creating the police thread 1 log (174), a single police thread log is known not to have any internal dependency violations. Accordingly, the master police thread (178) is required to only check for dependency violations between police thread logs (e.g., police thread 1 log (174), police thread x log (176)).

Those skilled in the art will appreciate that the aforementioned discussion of the assignments to police threads are only a few of the possible assignment techniques. Specifically, the police threads may be assigned in virtually any manner for comparing the logs. Using the police threads dependency violations may be identified earlier (i.e., possibly before the parallelized portion of the application completes execution).

Figure 4:
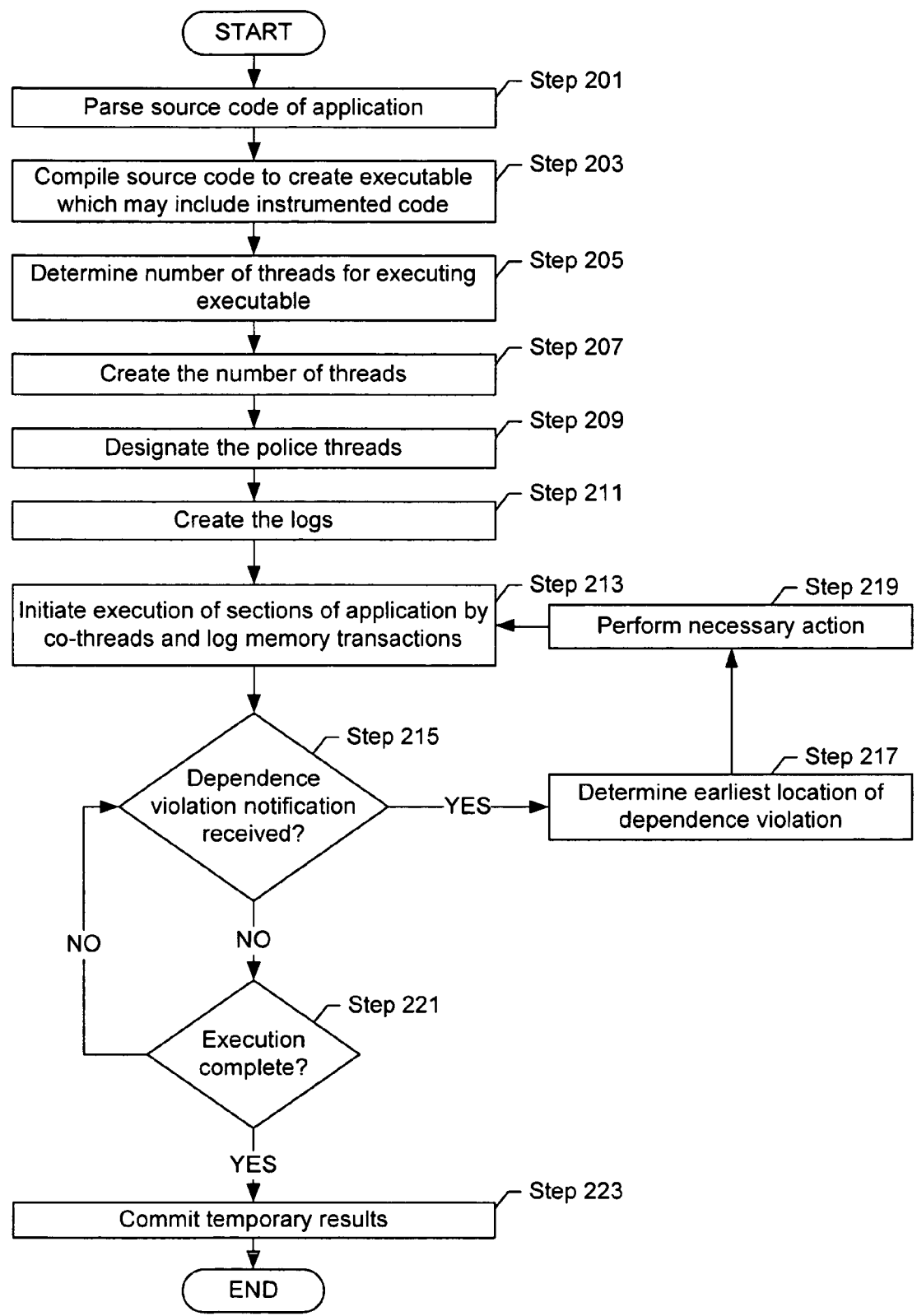
FIG. 4 shows a flowchart of a method for detecting dependence violations in a distributed computer system in accordance with one embodiment of the invention.

FIG. 4 shows a flowchart of a method for detecting dependence violations in a distributed computer system in accordance with one embodiment of the invention. Initially, the source code is parsed (Step 201). Next, the parsed source code is compiled to create executable code which may include instrumented code (Step 203). Alternatively, in one embodiment of the invention, after the executable code is created, a runtime parser may create instrumented code (not shown).

After the code is compiled, the number of threads that are to execute the executable code (or a portion thereof) in parallel is determined (Step 205). The number of threads may be specified in the code or input as parameters during execution of the application. Further, in one embodiment of the invention, the number of threads may be determined during runtime by the runtime system depending on the resources available at the time in the system. Once the number of threads is determined, the number of threads may be created (Step 207). In one or more embodiments of the invention, the number of threads may be created, for example, by initiating execution of the code on separate nodes.

After creating the number of threads, in one embodiment of the invention, at least one thread is designated as a police thread. The remaining threads are designated as co-threads (Step 209). Also at this stage, sections of the application may be assigned to the co-threads (not shown). Specifically, each co-thread may be assigned a section to execute.

Next, logs are created for the co-threads (Step 211). In one embodiment of the invention, the creation of the logs in Step 211 corresponds to designating files and/or memory space to store the logs. However, at this stage the logs are typically not populated with any content. If a hierarchy is used (as described in FIG. 3), then the logs may also be created for all or part of the police threads.

Figure 5:
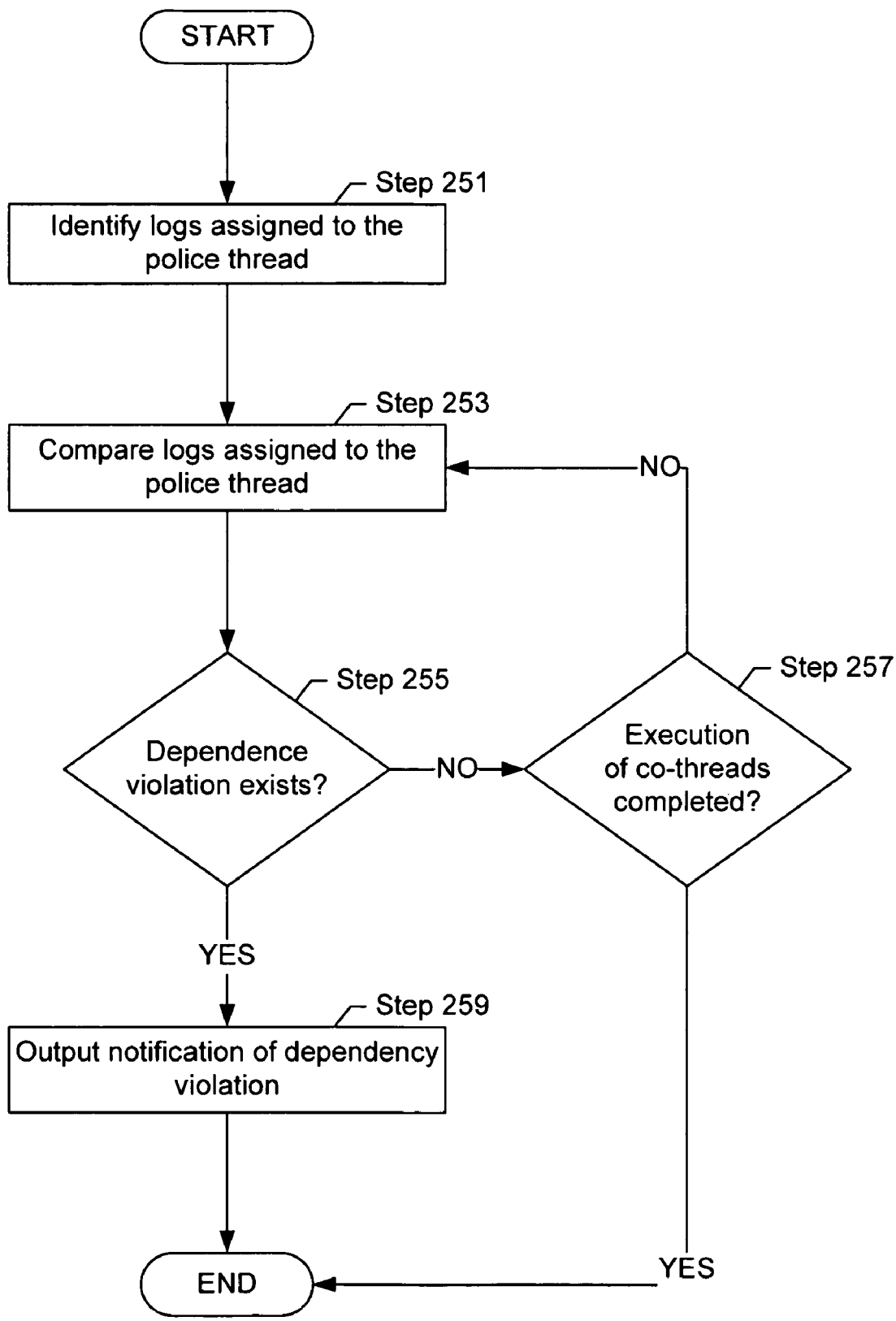
FIG. 5 shows a method for executing a police thread in accordance with one embodiment of the invention.

Once the logs are created for the threads (i.e., co-threads and/or police threads) then execution of sections of the application and logging memory transactions by the co-threads is initiated (Step 213). Specifically, the co-threads begin executing the section of the application that the co-thread is assigned. When the execution of the section of the application is initiated, the police threads also begin executing. Thus, while executing the sections, the police threads monitor the logs as the logs are being populated in accordance with one or more embodiments of the invention. FIG. 5, discussed below, shows a method for executing a police thread in accordance with one embodiment of the invention.

Continuing with FIG. 4, while the police threads are executing dependence violations may be found. Accordingly, during execution of the threads, a determination is made whether a dependence violation notification is received (Step 215). A dependence violation notification may be received as a signal, interrupt, message, etc. Checking for the dependency violation notification may be performed periodically, such as polling to check for whether a flag is set, or simply by continuing execution until a halt signal is received.

If a dependency violation exists, then the earliest location of the dependency violation is determined (Step 217). Determining the earliest location of the dependency violation may be performed by the police thread that registers the dependency violation. One skilled in the art will appreciate that determining the earliest location is not a requirement as any dependence violation may be handled by restarting and running sequentially. In one or more embodiments of the invention, a dependency violation exists when a write to a memory location is performed before a read to the same memory location when executed in serial and the write and the read are performed by two different co-threads.

For example, consider the scenario in which co-thread 1 executes the first three iterations of a loop and co-thread 2 executes the last three iterations of the loop. In the example, in the first iteration, co-thread 1 may be required to write to memory location A and co-thread 2 may be required to read from memory location A. In such scenario, because co-thread 1 does not commit transactions, the value that co-thread 2 reads from memory location A is not the correct value (i.e., the value that co-thread 1 wrote) in accordance with one or more embodiments of the invention. Accordingly, a dependency violation exists.

The earliest location of the dependency violation may be determined as the location of the read in accordance with one or more embodiments of the invention. Specifically, in one or more embodiments of the invention, because the write performs the change to the memory location, the write to the memory location is correct.

Once the location of dependency violation is determined, then the necessary actions may be performed to address the dependency violation (Step 219). In one embodiment of the invention, temporary results performed before the earliest location of dependency violation may be committed, while the temporary results corresponding to the execution of section at or after the earliest location are re-executed. Re-executing the threads may be performed in serial or in parallel. Specifically, at this stage a determination may be made as to whether the performance gain may be attained by parallelizing the sections. If the sections are parallelizable, then execution of the sections may be reinitiated using the co-threads and police threads (Step 213). Alternatively, the sections may be executed in serial.

Continuing with FIG. 4, if alternatively, a dependence violation notification is not received, than a determination is made whether execution is completed (Step 221). If execution has not completed, then execution continues with checking for dependency violations.

When execution completes, then the temporary results that are created may be committed (Step 223). Committing the temporary results may be performed using techniques well known in the art.

As shown in FIG. 4, by checking for dependency violations while executing the sections of the application, the cost of finding the dependency violation is reduced. Specifically, the cost of the dependency violation is changed to the number of instructions that would have to be re-executed. For example, 100 iterations of a loop exist, and the dependency violation is determined at loop iteration 15, then the cost of the dependency violation is reduced from having wasted the 100 iterations to only the number of iterations that executed before the dependency violation is discovered. As shown in the example, the police threads help improve performance associated with discovering a dependency violation by enabling discovery before completely executing the parallel sections.

FIG. 5 shows a method for executing a police thread in accordance with one embodiment of the invention. Initially, the logs assigned to the police thread are identified (Step 251). At this stage, the police thread determines what the police thread is responsible for comparing. The assignment of the police threads may be performed in any manner as discussed above in FIG. 2.

Next, the police thread compares the logs assigned to the police thread (Step 253). Comparing the logs may be performed by comparing the writes in a lower section with the reads in a higher section. A lower section corresponds to a section that if performed in serial with a higher section would be performed before the higher section. In one or more embodiments of the invention, while the police threads are comparing the logs, locks on the log are not used. Specifically, a police thread may be reading from a log that is being added to by a co-thread. Thus, comparing the logs is ongoing throughout execution.

Optimizing the comparison may be performed by having the police thread compare the log associated with the lowest section before the log associated with the highest section. For example, if the police thread is assigned log 1, log 2, . . . log j, then the police thread may first compare log 1 with log 2, then log 1 with log 3, etc. Thus, identifying the dependency violation may be performed as early as possible in the execution.

While performing the comparison, a determination is made whether a dependency violation exists (Step 255). Determining whether a dependency violation exists may be performed as discussed above. If a dependency violation exists then notification of dependency violation may be generated (Step 259). At this stage, the police threads may stop executing (as shown in FIG. 5) or continue comparing the logs.

Alternatively, if a dependency violation does not exist, then a determination is made whether execution of the co-threads has completed (Step 257). If execution of the co-threads has completed, then a last comparison through the logs may be performed to ensure that a newly created dependency violation does not exist (not shown). Alternatively, if the co-threads are still executing, then the police thread continues comparing the logs (Step 253) in accordance with one or more embodiments of the invention.

One skilled in the art will appreciate that multiple techniques exists for comparing lists, such as lists of memory locations in logs. Accordingly, comparing the logs may be performed using any technique known in the art.

In the following example, consider the scenario in which an application defines two arrays as follows: the values for array B are set as (0, 1, 2, 3, 4, 5, 6, 7, 8, 9, 10, 11, 12, 13, 14) and the values for array C are set as (1, 3, 5, 7, 9, 6, 8, 5, 2, 7, 6, 10, 11, 12, 13). Further, after setting the values of the above arrays, the application has a speculatively parallelized loop defined as:

```
for (int i = 0; i < 15; i++)
    A[B[i]] = A[C[i]];
```

Further, in the example, consider the scenario in which three co-threads (i.e., co-thread 0, co-thread 1, co-thread 2) are used for the speculative parallelism. In the example, co-thread 0 executes the section defined by i=0 to i=4 iterations of the loop, co-thread 1 executes the section defined by i=5 to i=9 iterations of the loop, and co-thread 2 executes the section defined by i=10 to i=14 iterations of the loop. Further, in the example, there are three police threads (i.e., police thread 0, police thread 1, and police thread 2). Police thread 0 is assigned to co-thread 1 to check log 1 against the log 0 of co-thread 0, police thread 1 is assigned to co-thread 2 to check the log 2 of co-thread 2 against the log 0 of co-thread 0, and police thread 2 is assigned to co-thread 2 to check the log 2 of co-thread 2 against the log 1 of co-thread 1.

For the purposes of the example, consider the case in which each thread executes at the same rate. Accordingly, in each step co-threads and police threads perform at the same time. Those skilled in the art will appreciate that in use, such scenario may not be the case.

In one or more embodiments of the invention, the execution of the co-threads may proceed and create the logs as shown in the following table:

| Step | Log 0 Read | Log 0 Write | Log 1 Read | Log 1 Write | Log 2 Read | Log 2 Write |
|---|---|---|---|---|---|---|
| 1 | A[1] | A[0] | A[6] | A[5] | A[6] | A[10] |
| 2 | A[3] | A[1] | A[8] | A[6] | A[10] | A[11] |
| 3 | A[5] | A[2] | A[5] | A[7] | A[11] | A[12] |
| 4 | A[7] | A[3] | A[2] | A[8] | A[12] | A[13] |
| 5 | A[9] | A[4] | A[7] | A[9] | A[13] | A[14] |

Accordingly, during execution of the co-threads, the police threads are also comparing the logs. In the example, during each step shown above in the logs and performed by the co-threads, the execution of the police threads may proceed as follows:

In step 1, police thread 0, police thread 1, and police thread 2 may notice a possible exposed load when co-thread 1 and co-thread 2 read element A[6], as shown in the read columns of log 1 and log 2, in the above table. While the police threads may check for a write to A[6], the police threads do not find a write. Thus, execution continues to step 2.

In step 2, police thread 0 notices a possible exposed load when co-thread 1 reads element A[8]. However, because a write to A[8] does not exist, a dependency violation is not identified. Also, in step 2, police thread 1 and police thread 2 find a possible exposed load, and check for a dependence on A[6]. The dependency for A[6] is found in the log 1 of co-thread 1. Accordingly, police thread 0 issues a dependency violation notification to co-thread 1. Further, any co-threads assigned to later computations may be halted in accordance with one or more embodiments of the invention. Thus, police thread 1 and police thread 0 may be retired or assigned to other tasks.

Figure 6:
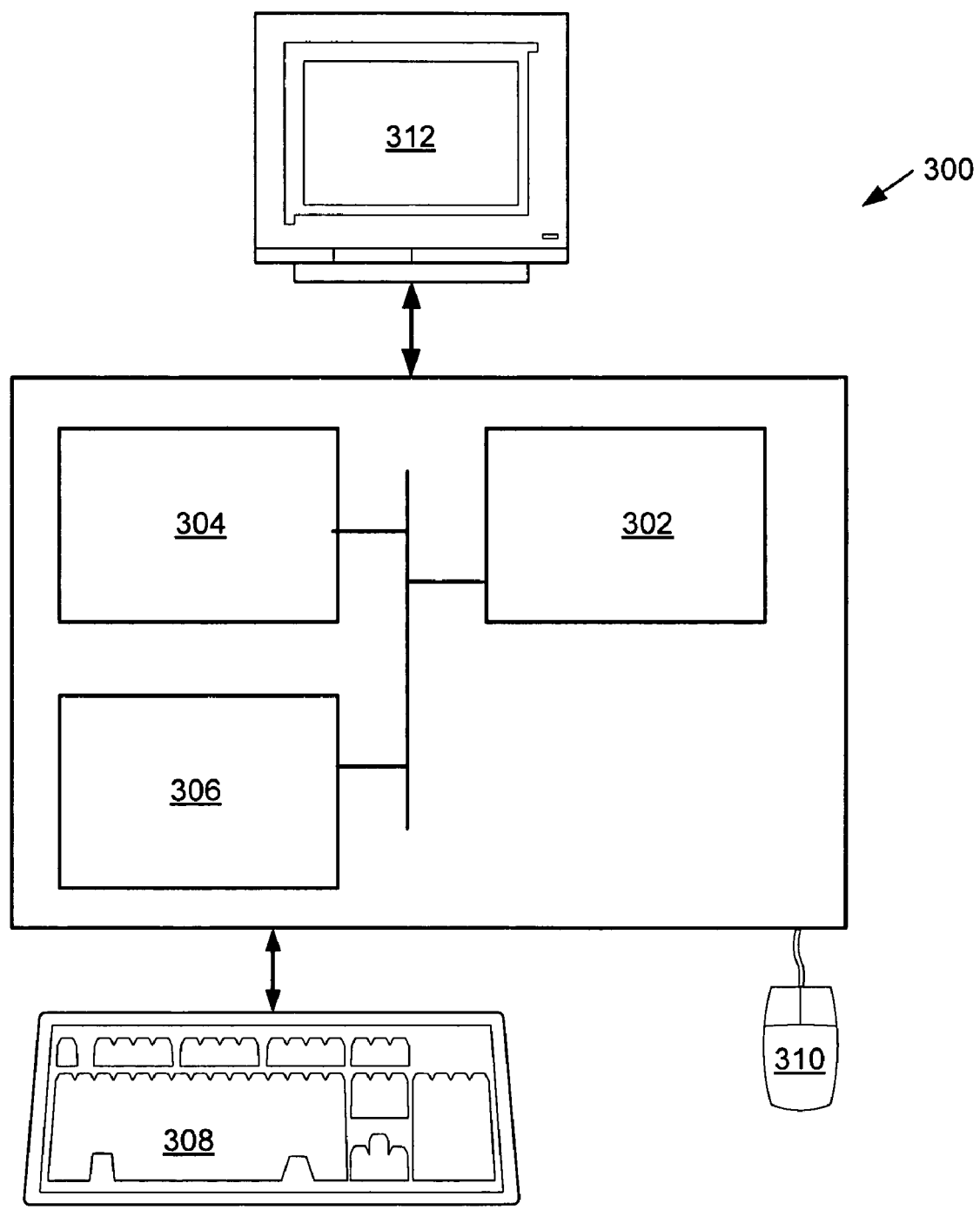
FIG. 6 shows a computer system in accordance with one embodiment of the invention.

The invention may be implemented on virtually any type of computer regardless of the platform being used. For example, as shown in FIG. 6, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) may be connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., police threads, logs, co-threads, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for data race checking and to detect early whether a dependency violation exists when performing speculative parallelism. Specifically, by using police threads to determine whether a dependency violation exists, the cost associated with finding a dependency violation is minimalized because the police threads find the violation early and prevent the waste of system resources that would complete all calculations before checking for dependencies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing speculative parallelization, comprising:
   executing, by a first computer processor, a first co-thread of an application;
   executing, by a second computer processor, a second co-thread of the application in parallel with the first co-thread;
   assigning a first memory log to the first co-thread;
   assigning a second memory log to the second co-thread;
   assigning a first police thread to the first memory log and the second memory log;
   while executing the second co-thread in parallel with the first co-thread:
      logging, in the first memory log, a first plurality of memory transactions requested by the first co-thread;

logging, in the second memory log, a second plurality of memory transactions requested by the second co-thread;

maintaining a plurality of temporary results for the first co-thread and the second co-thread;

performing, by the first police thread, a first comparison of the first memory log with the second memory log; and identifying, based on the first comparison, a first dependence violation between the first co-thread and the second co-thread, wherein the first dependence violation is caused by a write to a memory location performed by the first co-thread before a read to the same memory location performed by the second co-thread; and in response to identifying the first dependence violation:
determining a location of the read within the second co-thread where the first dependence violation occurs;
committing a first portion of the plurality of temporary results occurring prior to the location;
rolling back a second portion of the plurality of temporary results occurring after the location; and
generating a notification of the first dependence violation.

2. The method of claim 1, wherein the first co-thread and the second co-thread each comprise at least one conditional expression of the application.

3. The method of claim 1, wherein the first co-thread and the second co-thread each comprise a plurality of iterations in a loop of the application.

4. The method of claim 3, wherein the first comparison is performed in order of the plurality of iterations in the loop.

5. The method of claim 1, wherein the first memory log and the second memory log comprise only memory transactions associated with at least one indeterminable variable.

6. The method of claim 1, wherein performing the first comparison comprises:
comparing a portion of the first plurality of memory transactions corresponding to the write in the first memory log with a portion of the second plurality of memory transactions corresponding to the read in the second memory log.

7. A system for performing speculative parallelization, comprising:
a first co-thread executing on a first computer processor;
a second co-thread executing on a second computer processor in parallel with the first co-thread;
a first memory log assigned to the first co-thread and configured to:
log, while executing the second co-thread in parallel with the first co-thread, a first plurality of memory transactions requested by the first co-thread;
a second memory log assigned to the second co-thread and configured to:
log, while executing the second co-thread in parallel with the first co-thread, a second plurality of memory transactions requested by the second co-thread; and
a first police thread assigned to the first memory log and the second memory log and configured to:
while executing the second co-thread in parallel with the first co-thread:
identify a plurality of temporary results for the first co-thread and the second co-thread;
perform a first comparison of the first memory log with the second memory log; and
identify, based on the first comparison, a first dependence violation between the first co-thread and the second co-thread, wherein the first dependence violation is caused by a write to a memory location performed by the first co-thread before a read to the same memory location performed by the second co-thread; and in response to identifying the first dependence violation:
determine a location of the read within the second co-thread where the first dependence violation occurs;
commit a first portion of the plurality of temporary results occurring prior to the location;
roll back a second portion of the plurality of temporary results occurring after the location; and
generate a notification of the first dependence violation.

8. The system of claim 7, wherein the first co-thread and the second co-thread each comprise at least one conditional expression of the application.

9. The system of claim 7, wherein the first co-thread and the second co-thread each comprise a plurality of iterations in a loop of the application.

10. The system of claim 9, wherein the first comparison is performed in order of the plurality of iterations in the loop.

11. The system of claim 7, wherein performing the first comparison comprises:
comparing a portion of the first plurality of memory transactions corresponding to the write in the first memory log with a portion of the second plurality of memory transactions corresponding to the read in the second memory log.

12. A distributed computer system for performing speculative parallelization, comprising:
a plurality of physical nodes;
a first co-thread executing on a first physical node of the plurality of physical nodes;
a second co-thread executing, in parallel with the first co-thread, on a second physical node of the plurality of physical nodes;
a first memory log assigned to the first co-thread and configured to:
log, while executing the second co-thread in parallel with the first co-thread, a first plurality of memory transactions requested by the first co-thread;
a second memory log assigned to the second co-thread and configured to:
log, while executing the second co-thread in parallel with the first co-thread, a second plurality of memory transactions requested by the second co-thread; and
a police thread assigned to the first memory log and the second memory log and configured, while executing the second co-thread in parallel with the first co-thread, to:
identify a plurality of temporary results for the first co-thread and the second co-thread;
perform a first comparison of the first memory log with the second memory log;
identify, based on the first comparison, a first dependence violation between the first co-thread and the second co-thread, wherein the first dependence violation is caused by a write to a memory location performed by the first co-thread before a read to the same memory location performed by the second co-thread; and in response to identifying the first dependence violation:
determine a location of the read within the second co-thread where the first dependence violation occurs;
commit a first portion of the plurality of temporary results occurring prior to the location;
roll back a second portion of the plurality of temporary results occurring after the location; and
generate a notification of the first dependence violation.

13. The method of claim 1, further comprising:
executing a third co-thread of the application in parallel with a fourth co-thread of the application;
creating a third memory log and a fourth memory log;
assigning a second police thread to the third memory log and the fourth memory log;
while executing the third co-thread in parallel with the fourth co-thread:
logging, in the third memory log, a third plurality of memory transactions requested by the third co-thread;
logging, in the fourth memory log, a fourth plurality of memory transactions requested by the fourth co-thread;
performing, by the second police thread, a second comparison of the third memory log with the fourth memory log to create a first police thread log;
performing a third comparison of the first police thread log with a second police thread log, wherein the second police thread log is created based on a parallel execution of a fifth co-thread of the application with a sixth co-thread of the application;
identifying, based on the third comparison, a second dependence violation; and
generating a notification of the second dependence violation.

14. The method of claim 1, further comprising:
re-starting, after committing the first portion of the plurality of temporary results, serial execution of the first co-thread at the location.

15. The system of claim 7, wherein the first police thread is further configured to:
re-start, after committing the first portion of the plurality of temporary results, serial execution of the first co-thread at the location.

16. The system of claim 7, further comprising:
a third co-thread executing on the first computer processor;
a fourth co-thread executing on the second computer processor in parallel with the third co-thread;
a third memory log configured to log, while executing the third co-thread in parallel with the fourth co-thread, a third plurality of memory transactions requested by the third co-thread;
a fourth memory log configured to log, while executing the third co-thread in parallel with the fourth co-thread, a fourth plurality of memory transactions requested by the fourth co-thread;
a second police thread assigned to the third memory log and the fourth memory log and configured, while executing the third co-thread in parallel with the fourth co-thread, to:
perform a second comparison of the third memory log with the fourth memory log to create a second police thread log; and
a master police thread configured to:
perform a third comparison of the first police thread log with a second police thread log, wherein the second police thread log is created based on a parallel execution of a fifth co-thread with a sixth co-thread;
identify, based on the third comparison, a second dependence violation; and
generate a notification of the second dependence violation.

\* \* \* \* \*